US009753642B2

(12) United States Patent
Tootill (10) Patent No.: US 9,753,642 B2
(45) Date of Patent: Sep. 5, 2017

(54) SYSTEM AND METHOD FOR MOUSELESS NAVIGATION OF WEB APPLICATIONS (75) Inventor: David Tootill, Mercer Island, WA (US)

(73) Assignee: CA, Inc., New York, NY (US)

( * ) Notice: Subject to any disclaimer, the term of this patent is extended or adjusted under 35 U.S.C. 154(b) by 2118 days.

(21) Appl. No.: 10/346,351

(22) Filed: Jan. 16, 2003

(65) Prior Publication Data
US 2004/0141012 A1 Jul. 22, 2004

(51) Int. Cl.
G06F 3/00 (2006.01)
G06F 3/02 (2006.01)
G06F 3/048 (2013.01)
G09G 5/00 (2006.01)
G06F 3/0489 (2013.01)
G06F 3/0482 (2013.01)
G06F 17/30 (2006.01)

(52) U.S. Cl.
CPC .......... *G06F 3/0489* (2013.01); *G06F 3/0482* (2013.01); *G06F 17/30899* (2013.01)

(58) Field of Classification Search
CPC .......... G06F 17/3089; G06F 17/30873; G06F 17/30905; G06F 17/30899; G06F 17/243; G06F 17/276; G06F 9/4443; G06F 3/0237; G06F 3/0481; G06F 3/0482
USPC .................. 715/505, 780, 760; 345/827, 172
See application file for complete search history.

(56) References Cited

U.S. PATENT DOCUMENTS

| | | | | |
|---|---|---|---|---|
| 5,916,310 A | * | 6/1999 | McCain | 710/67 |
| 6,898,762 B2 | * | 5/2005 | Ellis et al. | 715/716 |
| 6,983,331 B1 | * | 1/2006 | Mitchell et al. | 709/246 |
| 7,058,164 B1 | * | 6/2006 | Chan et al. | 379/88.17 |
| 2002/0036620 A1 | | 3/2002 | Tervo | |
| 2003/0090471 A1 | * | 5/2003 | Slaunwhite et al. | 345/172 |
| 2003/0112271 A1 | * | 6/2003 | Batalden et al. | 345/744 |
| 2003/0210270 A1 | * | 11/2003 | Clow et al. | 345/767 |

FOREIGN PATENT DOCUMENTS

EP 0 816 990 A2 1/1998

OTHER PUBLICATIONS

"HTML 4.01 Specification," W3C Recommendation, XP-002295224, Dec. 24, 1999, 7 pages <www.w3.org/TR/html4>, visited Sep. 6, 2004.
Notification of Transmittal of the International Search Report and the Written Opinion of the International Searching Authority, or the Declaration—Form PCT/ISA/220 (3 pages); PCT International Search Report—Form PCT/ISA/210 (4 pages), and Written Opinion of the International Searching Authority—Form PCT/ISA/237 (6 pages), PCT/US2004/001180, mailed Oct. 1, 2004.

* cited by examiner

*Primary Examiner* — Doon Chow
*Assistant Examiner* — Shourjo Dasgupta
(74) *Attorney, Agent, or Firm* — Pillsbury Winthrop Shaw Pittman LLP (57) ABSTRACT A method includes generating a display associated with a web-based application interface. The display includes a plurality of features. The method also includes associating each of the plurality of features with at least one first key selection. A user can navigate to one of the features using the at least one first key selection associated with the feature. The method further includes establishing at least one second key selection. The user can navigate within one of the features using the at least one second key selection. In addition, the method includes communicating the display for presentation to the user.

9 Claims, 8 Drawing Sheets

SYSTEM AND METHOD FOR MOUSELESS NAVIGATION OF WEB APPLICATIONS

TECHNICAL FIELD

This disclosure relates generally to the field of computer systems, and more particularly to a system and method for mouseless navigation of web applications.

BACKGROUND

A web-based application typically resides on a server that is accessible by multiple computers. The web-based application is typically oriented for use by casual users, or users who occasionally invoke the application or for shorter periods of time. Each user typically uses a mouse to navigate through the interface of the web-based application. In contrast, a client-based application typically resides on a single computer. Client-based applications are often oriented for use by power users, or users who invoke the application frequently or for an extended period of time. A problem with conventional web-based applications is that power users typically do not want to take their hands off the keyboard to use a mouse to navigate through the application interface. This may discourage power users from using web-based applications.

SUMMARY

This disclosure provides a system and method for mouseless navigation of web applications. In particular, a user may use the keys on a keyboard to navigate the interface of a web application. The user need not, but may if desired, use a mouse to navigate the application interface.

In one embodiment, a method includes generating a display associated with a web-based application interface. The display includes a plurality of features. The method also includes associating each of the plurality of features with at least one first key selection. A user can navigate to one of the features using the at least one first key selection associated with the feature. The method further includes establishing at least one second key selection. The user can navigate within one of the features using the at least one second key selection. In addition, the method includes communicating the display for presentation to the user.

In another embodiment, a method includes receiving a display associated with a web-based application interface. The display includes a plurality of features. Each of the plurality of features is associated with at least one first key selection. A user can navigate to one of the features using the at least one first key selection associated with the feature. At least one of the features is also associated with at least one second key selection. The user can navigate within the at least one feature using the at least one second key selection. The method also includes presenting the display to the user. The user can navigate the display using only a keyboard.

BRIEF DESCRIPTION OF THE DRAWINGS

For a more complete understanding of this disclosure, reference is now made to the following descriptions, taken in conjunction with the accompanying drawings, in which.

DETAILED DESCRIPTION OF EXAMPLE EMBODIMENTS

Figure 1:
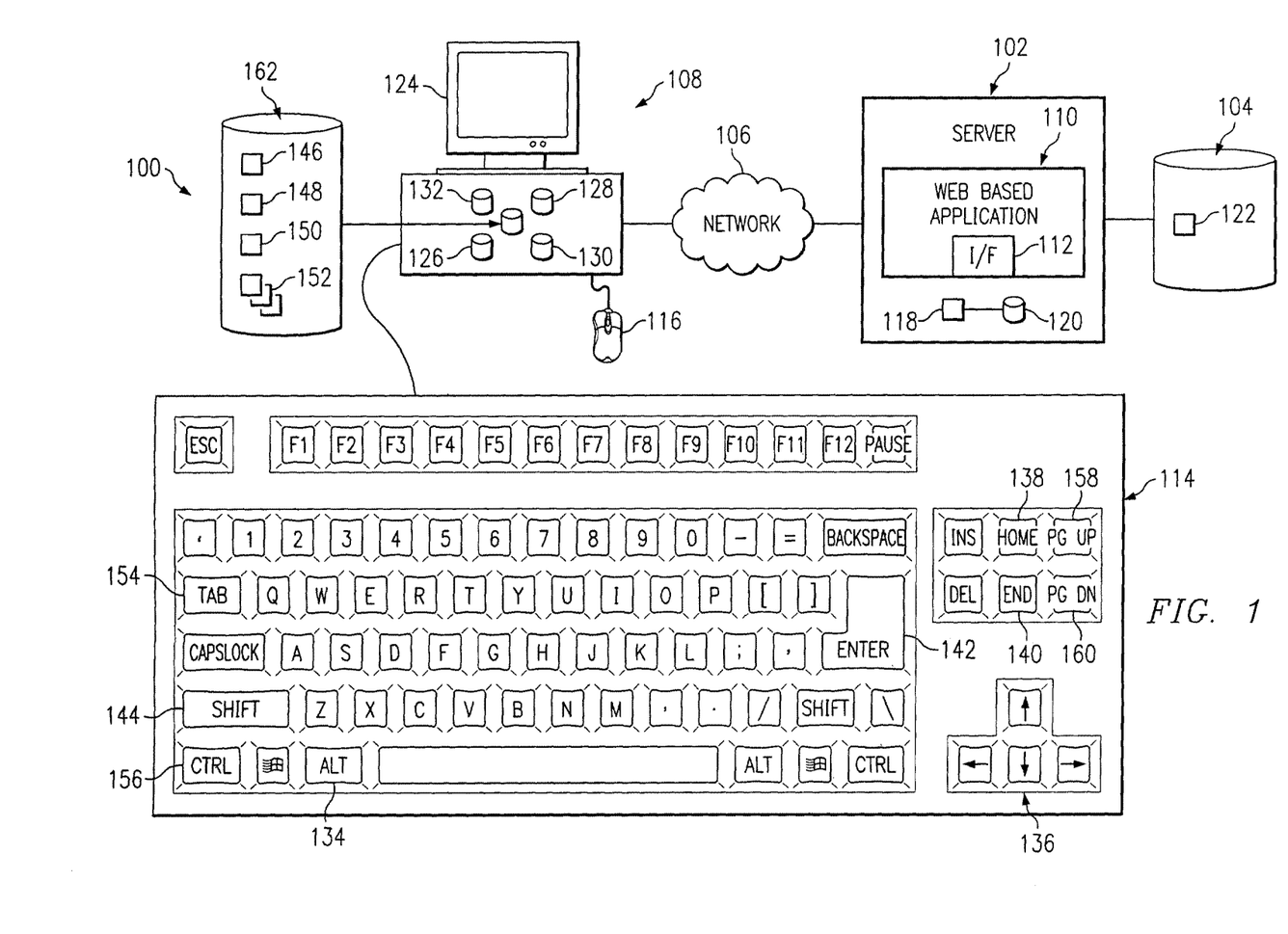
FIG. 1 is an exemplary block diagram illustrating an example system for mouseless navigation of a web application according to one embodiment of this disclosure.

FIG. 1 is an exemplary block diagram illustrating an example system 100 for mouseless navigation of a web application according to one embodiment of this disclosure. In the illustrated embodiment, system 100 includes a web server 102, a database 104, a network 106, and a host computer 108. Other embodiments of system 100 may be used without departing from the scope of this disclosure.

In one aspect of operation, host 108 may access and invoke execution of a web-based application 110 in server 102. Functions of application 110 can be invoked by host 108 through a user interface 112. In one embodiment, the interface 112 of application 110 can be navigated using a keyboard 114 at host 108. A user need not, but could if desired and supported, use a mouse 116 to navigate the interface 112 of application 110. By allowing navigation of application 110 using keyboard 114, more users may be willing to use web-based applications 110. This may also help to reduce or eliminate the need to support client-based applications in system 100.

In the illustrated embodiment, server 102 is coupled to database 104 and network 106. In this specification, the term "couple" refers to any direct or indirect communication between two or more components, whether or not those components are in physical contact with one another. Also, the term "communication" refers to communication between physically separate components or between components within a single physical unit. Server 102 performs one or more functions to provide services to host 108. For example, server 102 could execute one or more web-based applications 110 on behalf of one or more hosts 108. Server 102 may include any hardware, software, firmware, or combination thereof operable to provide services to host 108. In the illustrated embodiment, server 102 includes at least one processor 118 and a memory 120, although other embodiments of server 102 could also be used.

Application 110 may represent any suitable application, such as a set of instructions, procedures, functions, objects, classes, instances, and related data adapted for implementation in a suitable computer language such as C, C++, Java, or any other appropriate language. Interface 112 may represent any suitable user interface operable to be navigated by a user of host 108. Interface 112 may, for example, represent a web interface, where a user navigates through one or more web pages to invoke functions of application 110.

Database 104 is coupled to server 102. Database 104 stores and facilitates retrieval of information used by server 102. For example, database 104 may store application information 122, which represents information received from a host 108 to be processed by an application 110. Database 104 may include any hardware, software, firmware, or combination thereof operable to store and facilitate retrieval of information. Database 104 may also use any of a variety of data structures, arrangements, and compilations to store and facilitate retrieval of information.

Network 106 is coupled to server 102 and host 108. Network 106 facilitates communication between components of system 100. For example, network 106 may communicate Internet Protocol (IP) packets, frame relay frames, Asynchronous Transfer Mode (ATM) cells, or other suitable information between network addresses. Network 106 may include one or more local area networks (LANs), metropolitan area networks (MANs), wide area networks (WANs), all or a portion of a global network such as the Internet, or any other communication system or systems at one or more locations.

Host 108 is coupled to network 106. Host 108 may perform any of a variety of functions in system 100. For example, host 108 could allow a user to submit a request to invoke execution of an application 110 at server 102. Host 108 could also allow the user to transmit information 122 to be processed by server 102 and receive information to be displayed to the user. Host 108 may include any hardware, software, firmware, or combination thereof operable to communicate with server 102.

In the illustrated example, host 108 includes a keyboard 114, a mouse 116, an output device 124, random access memory (RAM) 126, read-only memory (ROM) 128, a CD, DVD, hard drive, or other storage and retrieval device or devices 130, and one or more processors 132. Host 108 is running browser 162, which can be any suitable browser, such as Microsoft Internet Explorer 5.0 or greater; Netscape 6.2 or greater; or Mozilla 1.0 or greater. Output device 124 may, for example, include a video display, a printer, a disk drive, a plotter, a speaker, or other suitable output device.

In one aspect of operation, interface 112 of application 110 could represent one or more web pages or other displays that server 102 can communicate to host 108. Host 108 can display the web pages to a user of host 108, such as through the use of web browser 162. The web pages could be used by the user to navigate application 110. For example, a web page generated by server 102 and displayed by host 108 could include menus, buttons, notebook tabs, forms, lists, or other additional components. The user could perform any suitable action using the web page, such as by lowering a menu, selecting a button, or typing information into a form. Any information collected using the web page could be made available to application 110. Application 110 could then take any suitable action, such as invoking a requested function using information supplied by the user.

In one embodiment, the user of host 108 can navigate the web pages or other displays using keyboard 114. In particular, the user can use keyboard 114 to navigate menus, select buttons or notebook tabs, jump between fields in forms, or otherwise navigate the interface 112 of application 110. In this embodiment, the user may be able to navigate application 110 without requiring the use of a mouse 116. The user might choose to navigate application 110 using mouse 116 if that functionality is available, but the use of mouse 116 may not be required in system 100.

The following description describes the use of particular keys on keyboard 114 to navigate interface 112. Other embodiments using other keys could also be used without departing from the scope of this disclosure. For example, the following description describes the use of Alt keys 134 on keyboard 114. In the Unix environment, the Meta key on keyboard 114 could be used in place of the Alt key 134. Also, the following description describes the user navigating one or more web pages. Other displays could be generated by server 102 and navigated by host 108 without departing from the scope of this disclosure.

In a particular embodiment, a web page forming at least a portion of interface 112 may be displayed at host 108. The web page could include buttons and notebook tabs. These features can be selected by the user at host 108 using the Alt keys 134 of keyboard 114. The web page could also include a menu, a list of items that can be selected by the user, or a form that can be filled in by the user. These features can be selected using the Alt keys 134 and navigated using the Tab key 154, arrow keys 136, the Home key 138, and the End key 140 of keyboard 114. The web page could further include hyperlinks, which can be selected using the Tab key 154 or the arrow keys 136 and activated using the Enter key 142 of keyboard 114. In addition, the web page could include multiple-line text boxes and selection lists, which can be navigated using the arrow keys 136, the Home key 138, and the End key 140 and exited using the same keys plus the Shift keys 144 of keyboard 114.

These and other navigation mechanisms are illustrated and described in greater detail below with respect to FIGS. 2A through 2E. The hardware, software, firmware, or combination thereof used to provide this navigation functionality may reside at any suitable location in host 108. For example, the logic could reside within browser 162 running on host 108, or in another suitable location or locations.

In one embodiment, the logic facilitating the use of at least some of these keys of keyboard 114 can be implemented within the standard features of a browser used by host 108 to display information to the user. The browser could be any suitable browser, such as Internet Explorer 5.0 and higher, Netscape 6.2 and higher, or Mozilla 1.0 and higher.

In a particular embodiment, the logic could have no footprint at host 108, such as by not requiring the use of cookies or plug-ins at host 108. For example, the logic could be implemented as JavaScript functions 146-152 provided by server 102 to be executed on host 108. In this embodiment, JavaScript functions 146-150 could help to support the use of the Alt keys 134 to navigate interface 112. As particular examples, JavaScript function 146 could be used by server 102 to generate a web page so that various menus, buttons, or other features of the web page can be selected using Alt-x key combinations. JavaScript function 148 could allow application 110 to detect when various Alt-x key combinations are pressed on keyboard 114. JavaScript function 150 could associate a particular Alt-x key combination with a particular action to be performed, such as jumping to a particular portion of a web page or invoking a function of application 110. Taken together, these scripts 146-150 allow application 110 to set up a web page with features that can be activated using Alt-x key combinations, detect when a particular Alt-x key combination is selected, and activate features or perform other actions requested by the user. In this specification, the phrase "Alt-x key combination" refers to a combination of at least one Alt key 134 and another key on a keyboard. Also, the phrase "key selection" may refer to individual keys or a combination of two or more keys on a keyboard.

One or more JavaScript functions 152 could also be used to facilitate the use of arrow keys 136, Home key 138, and End key 140 on keyboard 114. For example, JavaScript functions 152 could represent onkeydown event handlers, which detect when particular keys are pressed on keyboard 114. A web page can set up the onkeydown event handlers during the initial load of the web page at host 108. When the user presses an arrow key 136, the Home key 138, or the End key 140, the onkeydown event handler for that key detects this action and determines what action to perform for the user. This allows, for example, the user to jump between fields in a form or scroll through functions in a menu.

The use of JavaScript functions 146-152 is for illustration only. Other types of logic to implement the navigation functionality described above could be used without departing from the scope of this disclosure. For example, the navigation functionality could be implemented directly in a browser supported by host 108 and need not be implemented using JavaScript functions. As a particular example, a plug-in for the browser could provide the desired navigation functionality.

The use of Alt keys 134, arrow keys 136, Home key 138, and End key 140 to navigate interface 112 may leave other keys available for normal use at host 108. For example, host 108 may execute a browser that uses the Tab key 154 and the Ctrl key 156 to perform particular functions. By using other keys on keyboard 114 to navigate interface 112, the navigation functionality can be incorporated into the browser without changing the standard methods used by the browser. Also, conventional browsers allow a user to scroll up and down a web page using the arrow keys 136, and the same functionality is supported by the Page Up key 158 and the Page Down key 160. Using the arrow keys 136 to provide the navigation functionality described above still allows the user to scroll up and down a web page using the Page Up key 158 and the Page Down key 160.

Although FIG. 1 illustrates one example embodiment of a system 100 for mouseless navigation of a web application, various changes may be made to system 100. For example, while FIG. 1 illustrates one host 108 coupled to network 106 and accessing server 102, any number of hosts 108 can be used in system 100. Also, server 102 could execute any suitable number of applications 110. Further, server 102 could represent any suitable computing device. In addition, any suitable keys on keyboard 114 can be used to perform the functions described above.

FIGS. 2A through 2E are exemplary block diagrams illustrating example web pages navigated according to one embodiment of this disclosure. The web pages illustrated in FIGS. 2A through 2E could, for example, be generated by server 102 and navigated by host 108 of FIG. 1. The web pages illustrated in FIGS. 2A through 2E are for illustration only. Other web pages can be generated and navigated according to particular needs. Also, while the web pages shown in FIGS. 2A through 2E may be described as being generated and used in system 100 of FIG. 1, the web pages could also be generated and used in other systems.

Figure 2A:
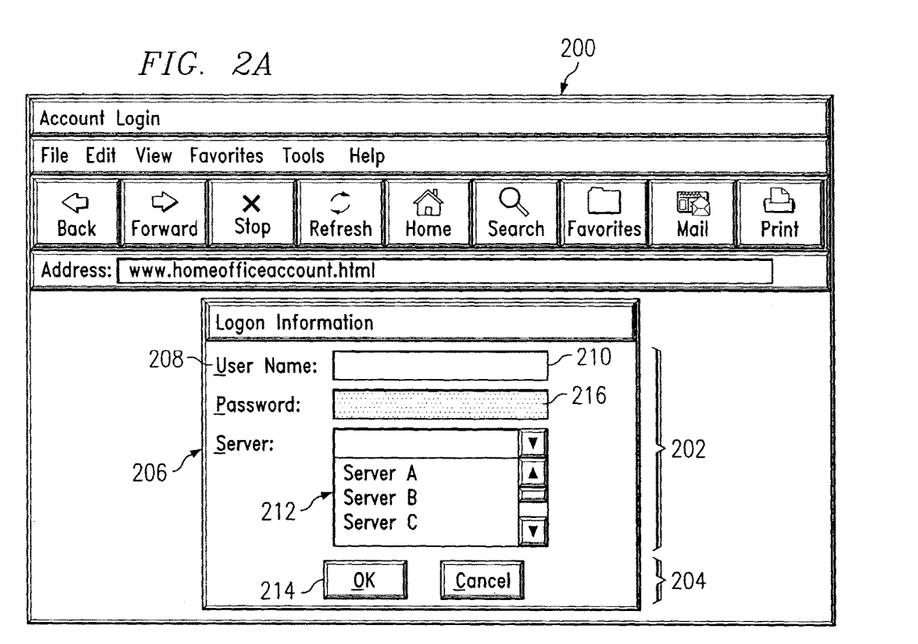
FIGS. 2A through 2E are exemplary block diagrams illustrating example web pages navigated according to one embodiment of this disclosure.

In FIG. 2A, web page 200 represents an interface that allows a user to log onto an application, such as application 110 in server 102. In the illustrated example, web page 200 includes an edit form 206 and buttons 204. Edit form 206 includes fields 202. Each field 202 includes a label 208 and a text box 210, and a text box 210 could have an associated selection list 212. Each button 204 includes a label 214.

In the illustrated embodiment, each label 208, 214 includes an underlined character. In one embodiment, a user can jump to a particular text box 210 by pressing Alt-x, where x represents the underlined character in the label 208 for that text box 210. Similarly, the user can select a particular button 204 by pressing Alt-x, where x represents the underlined character in the label 214 for that button 204.

The user could also jump between text boxes 210 in form 206 using the arrow keys 136. For example, the user could use the up and down arrow keys 136 to navigate vertically between text boxes 210 in form 206. The user could also press the Shift-Home key combination to jump to the first text box 210 in edit form 206 and the Shift-End key combination to jump to the last text box 212 in edit form 206.

An additional key may be used to navigate out of a text box 210 having an associated selection list 212. Selection lists 212 can typically be navigated using the arrow keys 136, the Home key 138, and the End key 140. To distinguish between navigation within the selection list 212 and navigation out of text box 210, the Shift key 144 is used. In particular, the arrow keys 136, the Home key 138, and the End key 140 can be used to move within the selection list 212. The Shift-Home, Shift-End, and/or Shift-arrow key combinations could be used to navigate out of a text box 210 having a selection list, which allows the user to jump to another text box 210. In this specification, the phrase "Shift-x key combination" refers to a combination of at least one Shift key 144 and another key on a keyboard.

To help the user identify which field 202 has the focus in edit form 206, the background color 216 of the text box 210 in focus can be changed. In this specification, the term "focus" refers to the portion of a web page or other display at which user activity is directed. For example, in one embodiment, the background color 216 of the field in focus is changed to pale yellow. Other suitable colors can be used, and the selected color could vary depending on the background color ordinarily used in text boxes 210.

Figure 4:
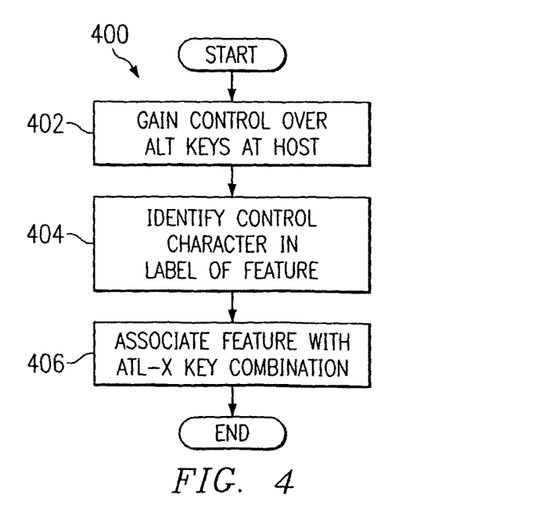
FIG. 4 is an exemplary flow diagram illustrating an example method for establishing a mechanism to select a feature of a web application according to one embodiment of this disclosure.
Figure 5A:
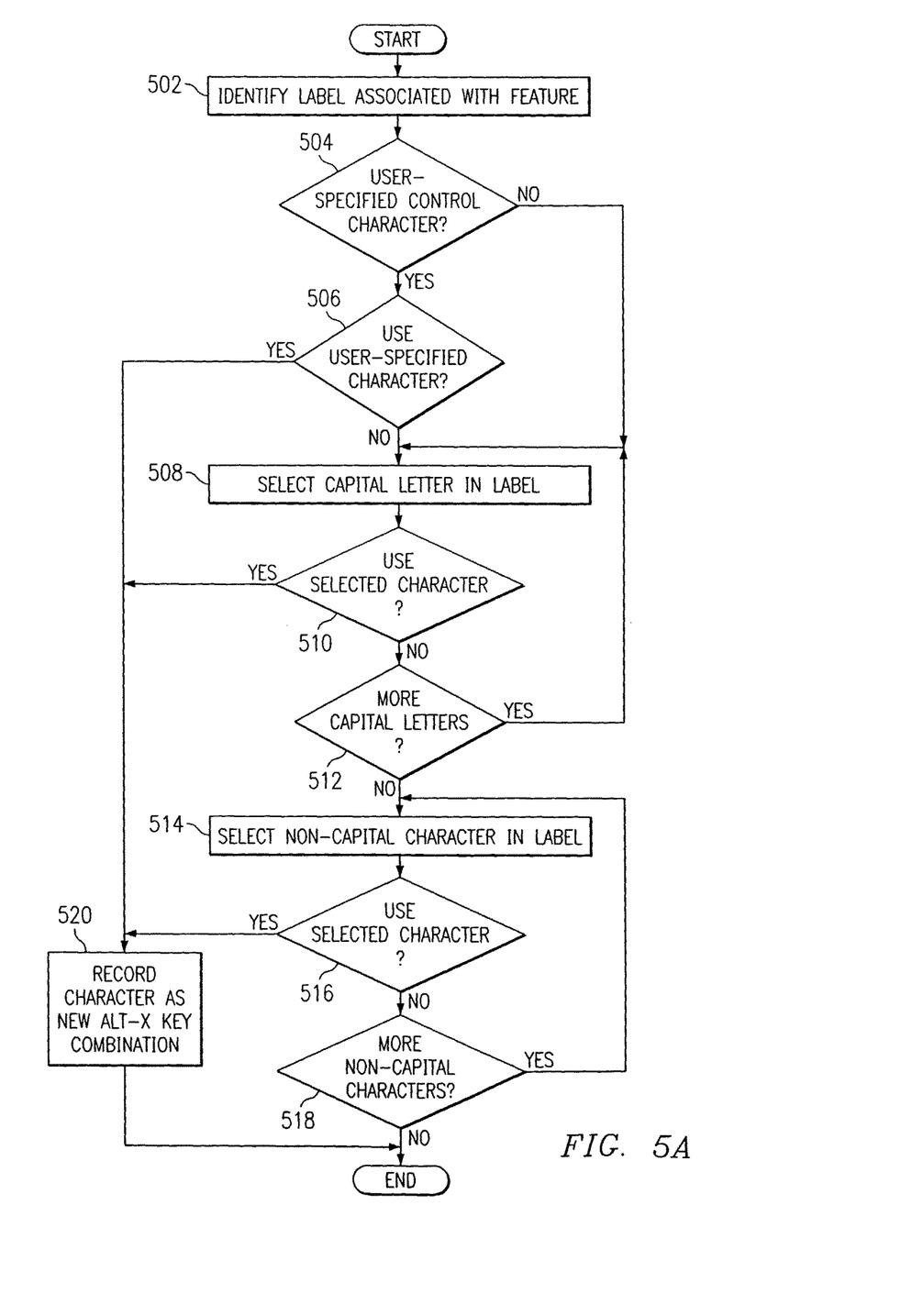
FIGS. 5A and 5B are exemplary flow diagrams illustrating an example method for identifying a control character used to select a feature of a web application according to one embodiment of this disclosure.
Figure 5B:
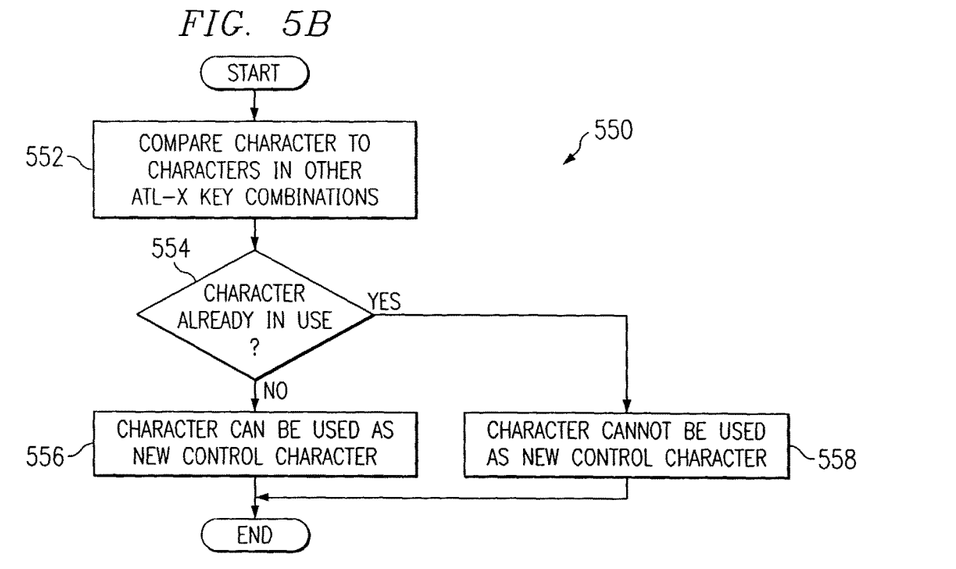

In a particular embodiment, host 108 can use the methods illustrated in FIGS. 4-5 to support navigation of web page 200 using the Alt keys 134. These methods allow host 108 to identify an appropriate character to underline in labels 208, 214. These methods also allow host 108 to associate an Alt-x key combination with a particular label 208, 214. These methods further allow host 108 to detect an Alt-x key combination pressed and to perform a requested action.

Figure 6:
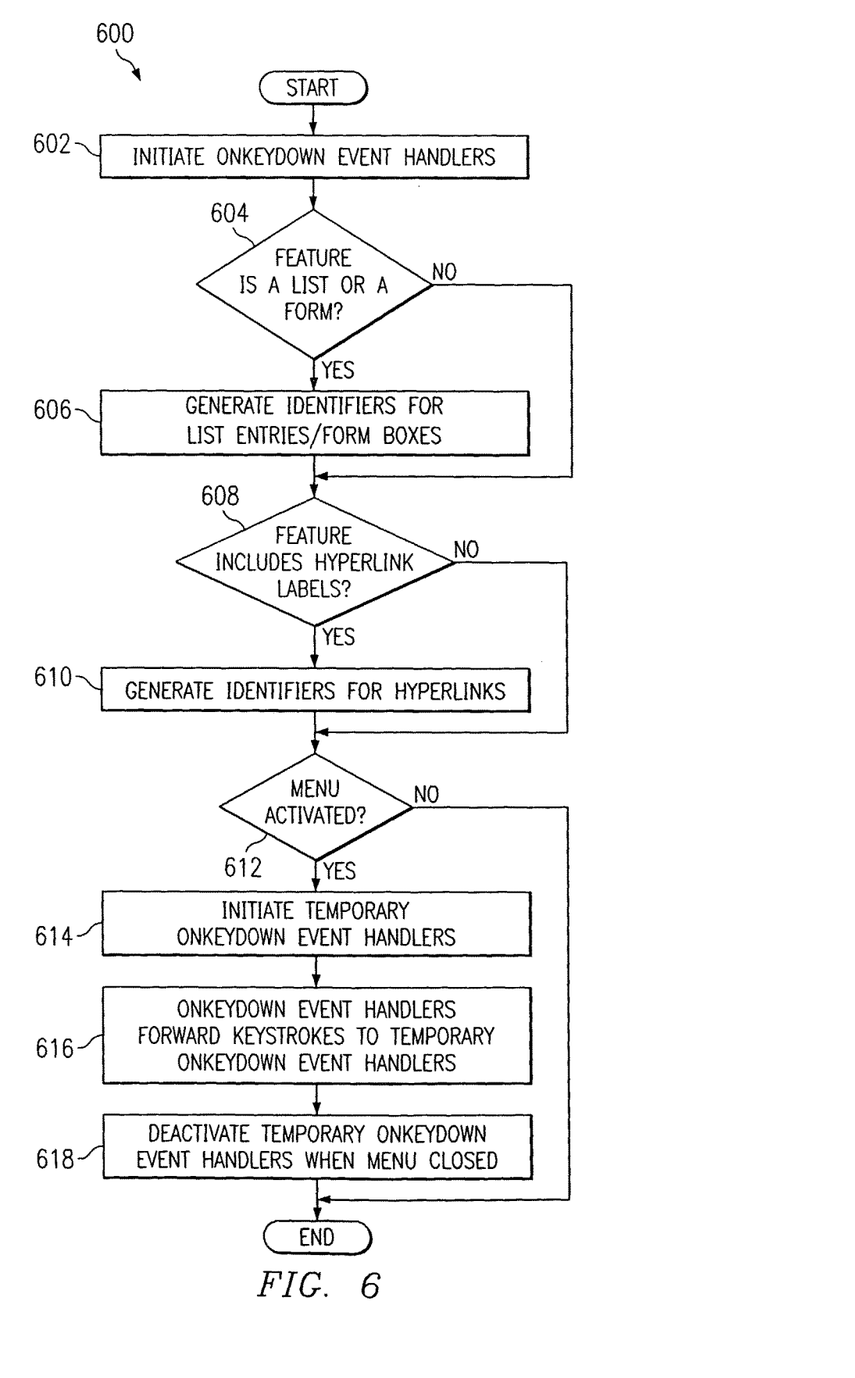
FIG. 6 is an exemplary flow diagram illustrating an example method for establishing a mechanism to navigate within a feature of a web application according to one embodiment of this disclosure.

In a particular embodiment, host 108 could also use the method illustrated in FIG. 6 to support navigation of web page 200 using the arrow keys 136, Home key 138, and End key 140 of keyboard 114. This method allows server 102 to create an identifier for each text box 210 in form 206. This method also allows server 102 to detect when an arrow key 136, Home key 138, or End key 140 is pressed at keyboard 114. This method further allows server 102 to determine the text box 210 that should be placed in focus using the identifier of the text box 210 currently in focus.

Host 108 can set up a web page to make it convenient to use Tab key 154 and the Shift-Tab key combination to navigate horizontally from field to field within the forms on a page. For example, host 108 may insert TABINDEX attributes into each field and link on the forms to explicitly specify the fields that can be reached with Tab key 154. In addition, host 108 may eliminate the possibility of the user's tabbing out of the forms altogether by pressing Tab from the last field on a page or Shift-tab from the first field. In a particular embodiment, host 108 could detect when a user uses the Tab key 154 to move away from the last field on a form by providing a hidden link field of the form:

<A HREF=about:blank TABINDEX=x onFocus="y( )"></A> where x is a number greater than that of any TABINDEX on the form and y( ) is a JavaScript function that sets the focus to the first field of the form. Host 108 could detect when a user uses the Shift-Tab key combination to move away from the first field of the form by providing a similar hidden link field where x is a number less than that of any TABINDEX on the form and y( ) is a JavaScript function that sets the focus on the last field of the form.

Figure 2B:
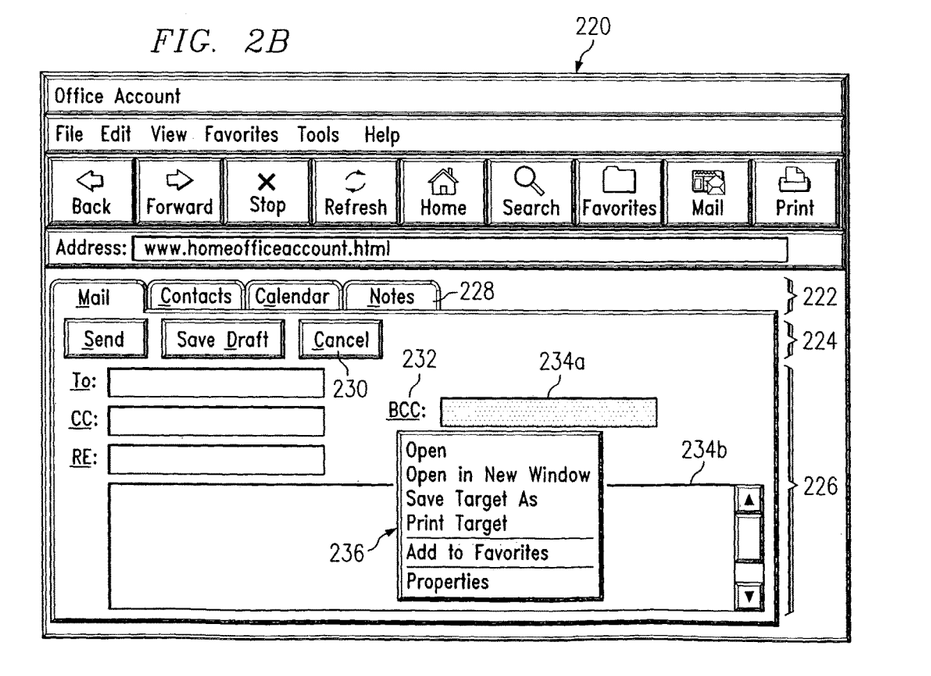

In FIG. 2B, a web page 220 represents an interface that allows a user to compose and send an electronic mail message. In the illustrated example, web page 220 includes notebook tabs 222, buttons 224, and an edit form 226. Notebook tabs 222 include labels 228, and buttons 224 include labels 230. In the illustrated embodiment, each label 228, 230 includes an underlined character. In this embodiment, a user can select a particular notebook tab 222 or button 224 by pressing Alt-x, where x represents the underlined character in a label 228, 230.

Edit form 226 includes labels 232, single-line text boxes 234a, and a multiple-line text box 234b. The user could navigate between text boxes 234 in edit form 226 using the arrow keys 136, the Home key 138, the End key 140, the Shift key 144, and the Tab key 154. For example, the user could use the up and down arrow keys 136 to navigate vertically between text boxes 234 and the Tab key 154 and Shift-Tab combinations to navigate horizontally between text boxes 234. The user could also press the Shift-Home key combination to jump to the first text box 234 and the Shift-End key combination to jump to the last text box 234. The user could press the Tab key 154 to jump from the last text box 234 to the first text box, or the Shift-Tab key combination to jump from the first text box 234 to the last text box.

An additional key may be used to navigate out of a multiple-line text box 234b. This is because the user typically navigates inside the multiple-line text box 234b using the arrow keys 136, Home key 138, and End key 140. To allow navigation away from multiple-line text box 234b, the user presses the Shift key 144 along with an arrow key 136, Home key 138, or End key 140. The Shift-Home, Shift-End, and/or Shift-arrow key combinations allow the user to transition out of multiple-line text box 234b to another text box 234.

In the illustrated embodiment, some of the labels 232 in form 226 represent hyperlinks. A hyperlink may be executed by pressing the Enter key 142 when the hyperlink is in focus. To place the hyperlink in focus, the text box 234 associated with the hyperlink label 232 is placed in focus. The user can then move to the hyperlink label 232 from the text box 234 by pressing the up arrow key 136. When a hyperlink acts as a label 232 for a text box 234, executing the hyperlink may present a selection list. The user could navigate the selection list using the arrow keys 136, Home key 138, and End key 140 as described above with respect to FIG. 2A and select an entry in the list. The selected entry then appears in the text box 234.

A hyperlink in web page 220 could also have an associated context menu 236. In this embodiment, the user could lower or expose the context menu 236 by pressing the right arrow key 136 when the hyperlink is in focus. The context menu 236 can then be navigated using the arrow keys 136, Home key 138, and End key 140 and closed using the left arrow key 136.

Figure 2C:
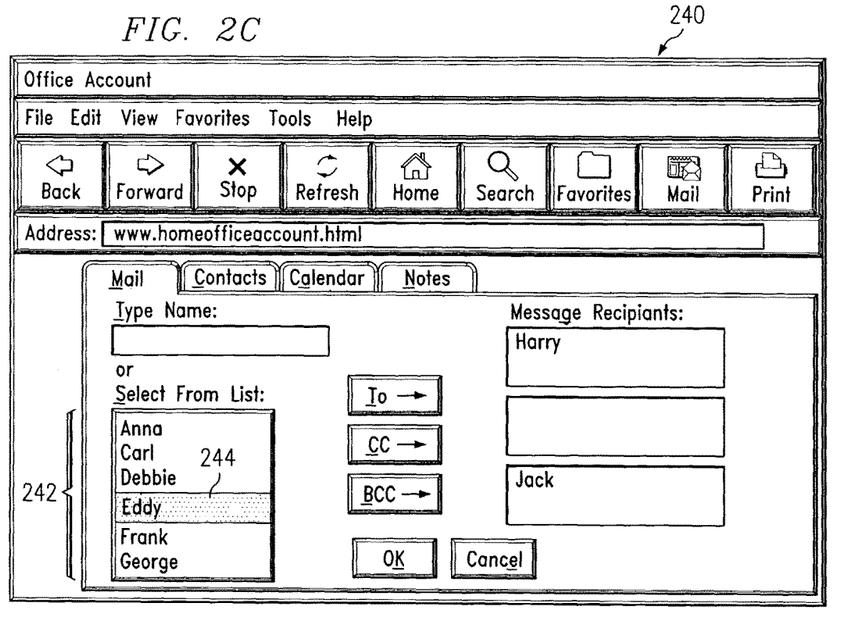

In FIG. 2C, a web page 240 represents an interface that allows the user to select possible recipients of an electronic mail message from a list 242. List 242 includes multiple entries, and the current entry 244 in focus is shaded. The user at host 108 can navigate list 242 using the up and down arrow keys 136. The user can also press the Home key 138 to select the first entry in list 242 and the End key 140 to select the last entry in list 242.

In one embodiment, the user may press the left arrow key 136 when the current entry 244 is the first entry of list 242. Similarly, the user may press the right arrow key 136 when the current entry 244 is the first entry of list 242. In a particular embodiment, when either of these events occur, the user's request may be ignored, and the focus may remain on list 242. In another embodiment, the user's request may cause the focus to switch to another feature of the web page 240.

Figure 2D:
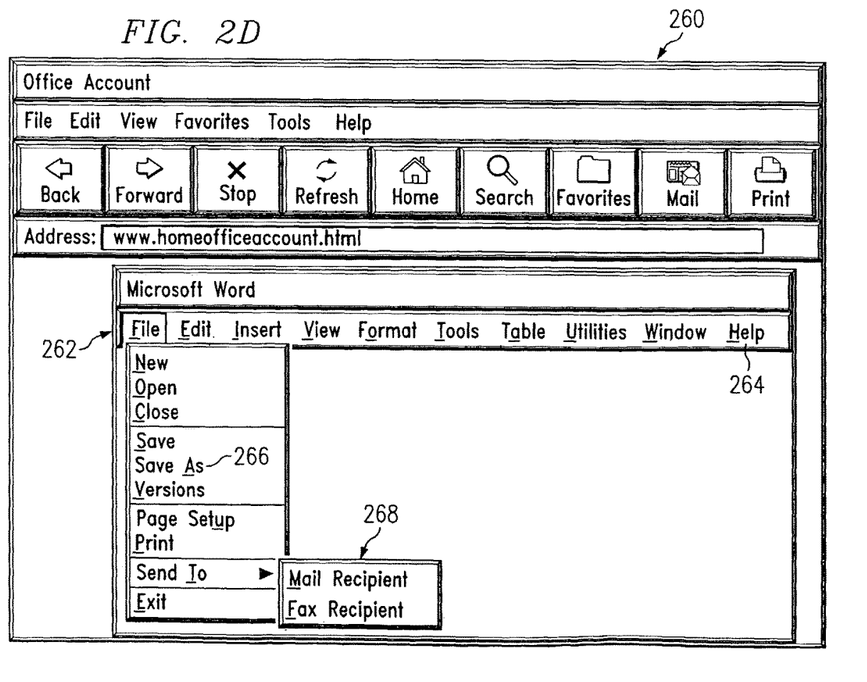

In FIG. 2D, a web page 260 represents an interface to a word processing application 110, which includes a menu bar 262. Menu bar 262 includes multiple menus 264. A user at host 108 may lower a menu 264 by pressing Alt-x, where x represents the underlined character in the menu 264. Once a menu 264 is activated by the user, server 102 displays a list of functions 266. The user can activate a function 266 by pressing the underlined letter for that function on the keyboard 114. The user could also scroll through the list of functions 266 using the arrow keys 136, Home key 138, and End key 140 and select one of the functions 266 by pressing the Enter key 142. The user could further move to adjacent menus 264 using the right and left arrow keys 136.

In one embodiment, a function 266 could have an associated hidden menu 268. The hidden menu 268 can be revealed by pressing the Enter key 142 when that entry 266 is in focus. The hidden menu 268 could also be revealed by pressing the right arrow key 136 when that entry 266 is in focus. In a particular embodiment, the user can also navigate down a menu 264 using the Tab key 154 and up the menu 264 using the Shift-Tab key combination. In this embodiment, the hidden menu 268 may not be revealed when the menu 264 is navigated using the Tab key 154 or the Shift-Tab key combination.

Figure 2E:
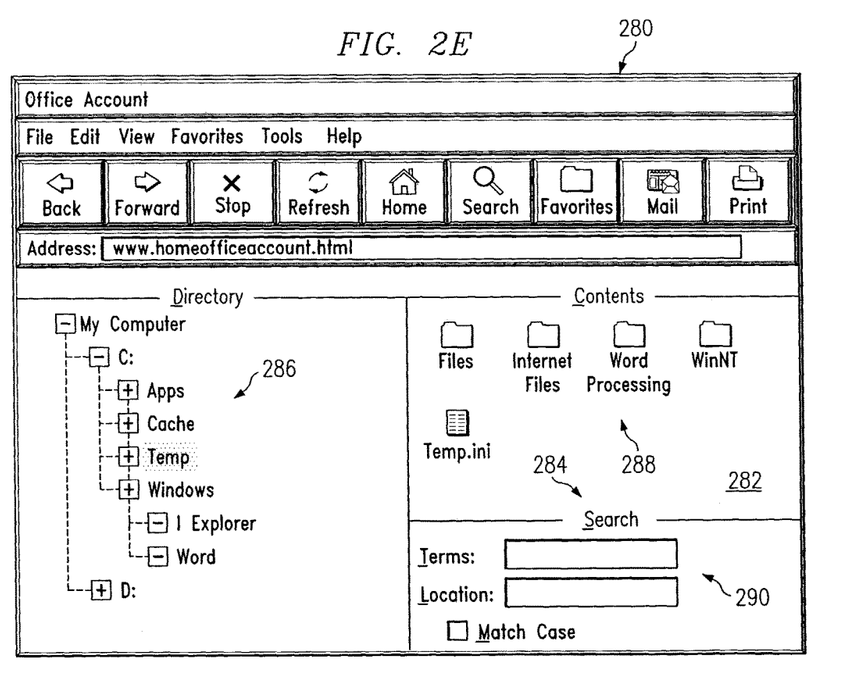

In FIG. 2E, a web page 280 represents an interface to a file directory system. In this example, web page 280 includes multiple frames 282, each having a label 284. Each frame 282 could have any suitable contents, such as a tree structure 286, a folder system 288, or a search system 290. A user at host 108 could jump between frames 282 using an Alt-x combination, where x represents the underlined character in a label 284. Once a frame 282 is in focus, the user can navigate within the frame 282. For example, the user could select the tree structure 286 using the appropriate Alt-x key combination. In one embodiment, each Alt-x key combination is unique within a frame 282, but the same Alt-x key combination could be used for other features in different frames 282. In another embodiment, each Alt-x key combination is unique within web page 280 without regard to different frames 282.

As described above, the user occasionally uses the Shift key 144 to navigate away from certain features in a web page, such as a multiple-line text box or a selection list. In one embodiment, the Shift key 144 could also be used with any other key combination described above to transition from one feature to another feature in a web page. In this embodiment, if the Shift key 144 is not required to differentiate navigation within a feature and navigation to another feature, the logic implementing the navigation functionality could ignore the use of the Shift key 144.

Although FIGS. 2A through 2E illustrate example embodiments of web pages navigated by a user in system 100, various changes may be made to FIGS. 2A through 2E. For example, the web pages shown in FIGS. 2A through 2E are for illustration only. Other web pages or displays having other contents and arrangements may be used. Also, the web pages displayed to the user could include other or additional features and are not limited to using menus, notebook tabs, buttons, and other features shown in FIGS. 2A through 2E.

Figure 3:
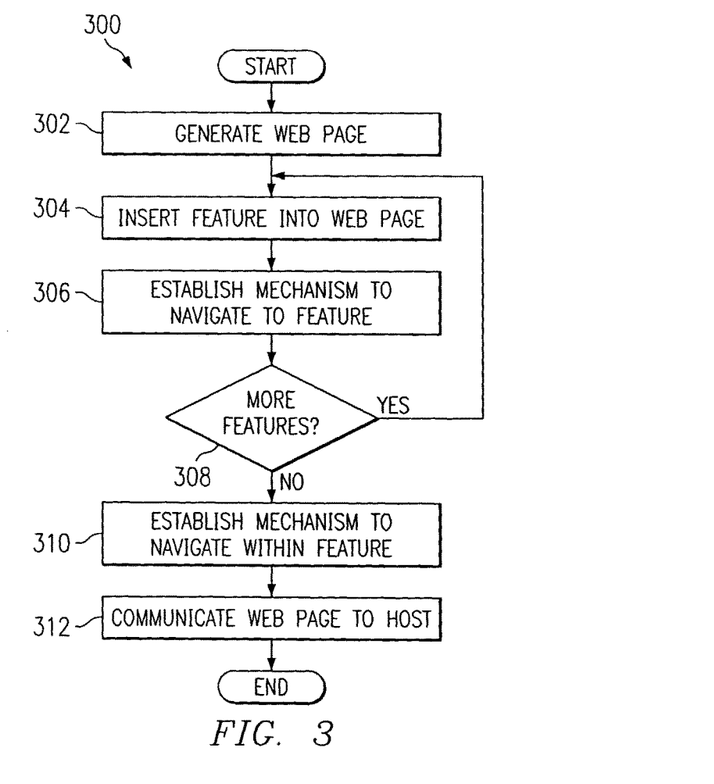
FIG. 3 is an exemplary flow diagram illustrating an example method for mouseless navigation of a web application according to one embodiment of this disclosure.

FIG. 3 is an exemplary flow diagram illustrating an example method 300 for mouseless navigation of a web application according to one embodiment of this disclosure. While method 300 may be described with respect to system 100 of FIG. 1, method 300 could be used by any other suitable system.

Server 102 generates a web page at step 302. This may include, for example, server 102 generating a web page forming at least a portion of interface 112 to an application 110 executed by server 102. Server 102 inserts a feature into the web page at step 304. This may include, for example, server 102 inserting a menu, button, notebook tab, edit form, list, or other feature into the web page. JavaScript functions inserted by server 102 and executed by browser 162 on host 108 establish a mechanism that can be used by a user to navigate to the new feature at step 306. This may include, for example, server 102 inserting one or more JavaScript functions that allow host 108 to establish one or more Alt-x key combinations, which can be used to place the focus in the web page on the new feature or a portion of the new feature. A method for establishing an Alt-x key combination is shown in FIG. 4, which is described below.

Server 102 determines whether additional features need to be added to the web page at step 308. If so, server 102 returns to step 304 to insert the next feature into the web page and instruct host 108 to establish a way to navigate to and within the next feature. Otherwise, server 102 establishes a mechanism to navigate within one or more of the features at step 310. This may include, for example, server 102 inserting one or more JavaScript functions that allow host 108 to set up onkeydown event handlers, which detect when the arrow keys 136, Home key 138, and End key 140 are pressed by the user at host 108. A method for establishing a mechanism to navigate within a feature is shown in FIG. 6, which is described below. Server 102 may communicate the web page to host 108 at step 312. This may include, for example, server 102 communicating the web page to a browser 162 at host 108 over network 104.

Although FIG. 3 illustrates an example method 300 for mouseless navigation of a web application, various changes may be made to method 300. For example, server 102 could establish the mechanism to navigate within the features before establishing the mechanism to navigate to each new feature. Also, server 102 could generate other types of displays and is not limited to generating web pages.

FIG. 4 is an exemplary flow diagram illustrating an example method 400 for establishing a mechanism to select a feature of a web application according to one embodiment of this disclosure. While method 400 may be described with respect to system 100 of FIG. 1, method 400 could be used by any other suitable system.

Host 108 gains control over the Alt keys 134 of keyboard 114 at step 402. This may include, for example, host 108 executing a JavaScript function 148 in browser 162. In one embodiment, JavaScript function 148 may write Hypertext Markup Language (HTML) of the form:

<A    ACCESSKEY=x    HREF="javascript:void(0)
    "ONFOCUS="altKeyPressed('x')"></A> for each of the 36 possible letters and numbers on keyboard 114. This disables any default use of the Alt keys 134 and allows host 108 to assign new functions to an Alt-x key combination. In a particular embodiment, the web page generated by server 102 may have multiple frames, and JavaScript function 148 could be executed 36 times for each frame. This helps to ensure that the same controls can be used no matter which frame is in focus.

Host 108 identifies a control character in the label of a new feature inserted into the web page at step 404. This may include, for example, host 108 identifying a character that can be underlined in the label of a menu, button, notebook tab, edit form, or list. A method for selecting a control character is shown in FIG. 5, which is described below.

Host 108 associates the new feature with an Alt-x key combination (where x represents the selected control character in the label) at step 406. This may include, for example, host 108 executing JavaScript function 150 to associate the Alt-x key combination with the new feature. When depressed by the user at host 108, the Alt-x key combination may cause focus to jump to a frame, edit form, or list in the web page. The Alt-x key combination may also cause a button or notebook tab to be selected in the web page.

Although FIG. 4 illustrates an example method 400 for establishing a mechanism to select a feature of a web application, various changes may be made to method 400. For example, host 108 could identify the control character before gaining control over the Alt keys 134. Also, host 108 is described as gaining control over the Alt keys 134 by executing JavaScript function 148 multiple times. Host 108 could also execute the JavaScript function 148 once each time a new Alt-x key combination is needed or in any other suitable manner. Further, if the JavaScript function 148 is used to disable all Alt-x key combinations, step 402 could be performed once by host 108, and host 108 need not execute JavaScript function 148 each time a new feature is added to the web page.

FIGS. 5A and 5B are exemplary flow diagrams illustrating an example method for identifying a control character used to select a feature of a web application according to one embodiment of this disclosure. In particular, FIG. 5A illustrates an example method for identifying potential control characters, and FIG. 5B illustrates an example method 550 for determining whether a potential control character should be used. While the methods of FIGS. 5A and 5B may be described with respect to system 100 of FIG. 1, the methods could be used by any other suitable system.

Host 108 identifies a label associated with a new feature at step 502. This may include, for example, host 108 identifying a label associated with a menu, button, notebook tab, edit form, or list. Host 108 determines whether the new feature has a user-specified control character at step 504. This may include, for example, host 108 determining whether the interface 112 to application 110 identifies a desired control character. If one exists, host 108 determines whether the user-specified control character can be used as the control character for the new feature at step 506. This is illustrated in FIG. 5B, which is described below. If the user-specified control character can be used, host 108 records the character as a new Alt-x key combination at step 520. Host 108 can then take any suitable action, such as establishing an Alt-x key combination as shown in FIG. 4 using the user-specified control character.

Host 108 selects a capital letter in the label at step 508. This may include, for example, host 108 examining the label identified at step 502 and determining if any capital letters exist in the label. Host 108 determines whether the selected capital letter can be used as the control character for the new feature at step 510. A selected capital letter can be used if it is not already in use, and the user has not included it in a list of letters to be excluded from consideration. If the letter can be used, host 108 records the selected capital letter as a new Alt-x key combination at step 520. Otherwise, the selected capital letter cannot be used, and host 108 determines whether additional capital letters exist in the label at step 512. If another capital letter exists, host 108 returns to step 508 to select the next capital letter and determine if it can be used.

If no more capital letters exist, host 108 identifies a non-capital character in the label at step 514. This may include, for example, host 108 identifying any non-capital letters or numbers in the label. Host 108 determines whether the selected non-capital character can be used as the control character at step 516. A selected non-capital letter can be used if it is not already in use, and the user has not included it in a list of letters to be excluded from consideration. If so, host 108 records the non-capital character as a new Alt-x key combination at step 520. Otherwise, the selected non-capital character cannot be used, and host 108 determines whether additional non-capital characters exist in the label at step 518. If another non-capital character exists, host 108 returns to step 514 to select the next non-capital character and determine if it can be used.

If no more non-capital letters are available, host 108 has failed to identify a control character for the new label. At that point, host 108 may take any suitable action. For example, a control character that could be used for the new feature might already be reserved for an existing feature in the web page. Host 108 could assign another control character to the existing feature and use the prior control character for the new feature.

FIG. 5B illustrates how host 108 determines whether to use a selected character as a control character. In FIG. 5B, host 108 compares the selected character to the characters used in other Alt-x key combinations at step 552. The other Alt-x key combinations could represent Alt-x combinations used for features previously added to the web page, Alt-x combinations reserved for use by browser 162, or other suitable Alt-x combinations. Host 108 determines whether the selected character is already used in an Alt-x key combination at step 554. If not, the selected character can be used as the control character for a new feature. Host 108 could then establish an Alt-x key combination using the identified control character at step 556. Host 108 could also underline the control character in the label of the new feature at step 556. Otherwise, the selected character is already used in another Alt-x key combination, and host 108 determines that the selected character cannot be used as a control character for the new feature at step 558.

Although FIGS. 5A and 5B illustrate example methods for identifying a control character used to select a feature of a web application, various changes may be made to the methods. For example, the method of FIG. 5A is illustrated as trying to use a user-specified character, capital letters, and non-capital characters in that order. In other embodiments, different preferences can be given to different types of characters. As particular examples, host 108 need not attempt to use a user-specified character, and host 108 need not favor capital letters over non-capital characters.

FIG. 6 is an exemplary flow diagram illustrating an example method 600 for establishing a mechanism to navigate within a feature of a web application according to one embodiment of this disclosure. While method 600 may be described with respect to system 100 of FIG. 1, method 600 could be used by any other suitable system.

Host 108 initiates onkeydown event handlers for one or more keys of keyboard 114 at step 602. This may include, for example, host 108 executing JavaScript functions 152 to detect the use of the arrow keys 136, Home key 138, and End key 140 at keyboard 114. This can occur upon the initial loading of a web page by browser 162.

Host 108 determines whether a feature being added to the web page is a list or a form at step 604. If so, host 108 generates identifiers for entries in the list or text boxes in the form at step 606. In one embodiment, each list entry or text box has an associated identifier. In a particular embodiment, an identifier has the form XXrrXcc, where rr is the row number of a list entry or text box and cc is the column number of the list entry or text box. Host 108 may use the identifiers associated with the list entry or text box to determine where to place the focus in the web page when the user presses an arrow key 136, the Home key 138, or the End key 140. When the user presses one of these keys, the onkeydown event handler for that key obtains the ID of the list entry or text box currently and extracts from it the row number and column number of the list entry or text box. The onkeydown event handler then calculates the identifier of the list entry or text box that should be in focus. For example, the current field in focus could have an identifier of XX02X01 (second row, first column). If the user presses the up arrow key 136, the onkeydown event handler for that key determines that the identifier of the desired list entry or text box is XX01X01 (first row, first column) and that field is placed in focus.

Host 108 determines whether a feature being added includes one or more hyperlink labels at step 608. If so, host 108 generates identifiers for the hyperlink labels at step 610. In a particular embodiment, the identifiers for the hyperlink labels have the form XXlnkrrXcc, where rr is the row number of a text box associated with the hyperlink label and cc is the column number of that text box. When the user presses the up arrow key 136 when focus is on a text box, the onkeydown event handler for that key obtains the ID of the list entry or text box currently and extracts from it the row and column number of that text box. The onkeydown event handler could then determine whether any hyperlink label has an identifier that includes those row and column numbers. If so, the onkeydown event handler can focus on that hyperlink label. As a particular example, a text box could have an identifier of XX02X02 (second row, second column). When the up arrow key 136 is pressed, the onkeydown event handler for that key examines this identifier and determines if a hyperlink label has an identifier of XXlnk02X02. If so, the onkeydown event handler can place the focus on that hyperlink label.

Host 108 detects if a menu is activated at step 612. This may include, for example, host 108 determining whether the user has pressed an Alt-x key combination associated with a menu. When a menu is lowered, host 108 initiates temporary onkeydown event handlers at step 614. In one embodiment, the arrow keys 136, Home key 138, and End key 140 may be used to perform particular functions in a web page. When a menu is lowered, the default onkeydown event handlers for these keys may be overridden so that the menu can be navigated using the same keys. When the user presses an arrow key 136, Home key 138, or End key 140, the default onkeydown event handler for that key forwards the user's keystroke to the temporary onkeydown event handler at step 616. The temporary onkeydown event handlers use the keystrokes to navigate the menu. The temporary onkeydown event handlers are then cancelled when the menu is closed at step 618. At this point, the default onkeydown event handlers reassume control, and the user can use the keys to perform the original functions in the web page.

Although FIG. 6 illustrates an example method 600 for establishing a mechanism to navigate within a feature of a web application, various changes may be made to method 600. For example, host 108 could generate any suitable identifiers for the list entries, text boxes, and hyperlink labels and maintain a table of these identifiers containing the associated row and column number. Also, server 102 could use other techniques to allow navigation within a lowered menu.

Figure 7:
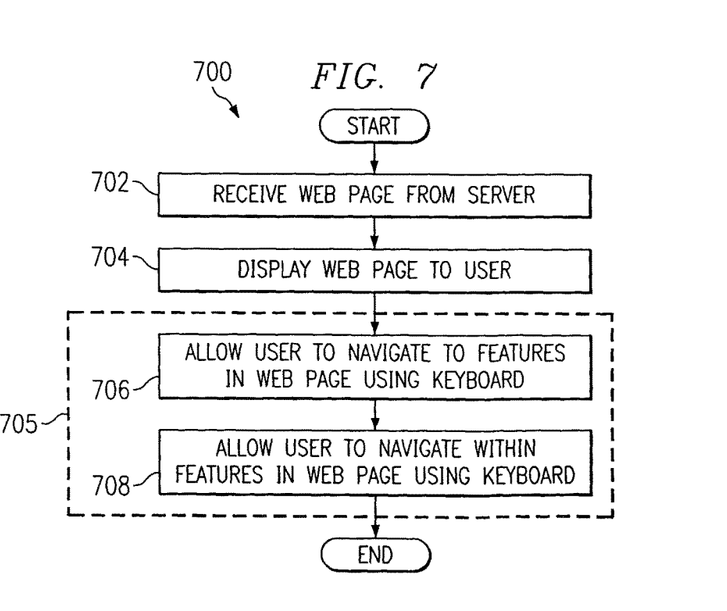
FIG. 7 is an exemplary flow diagram illustrating an example method for allowing a user to navigate a web application using a keyboard according to one embodiment of this disclosure.

FIG. 7 is an exemplary flow diagram illustrating an example method 700 for allowing a user to navigate a web application using a keyboard according to one embodiment of this disclosure. While method 700 may be described with respect to system 100 of FIG. 1, method 700 could be used by any other suitable system.

Host 108 receives a web page from server 102 at step 702. This may include, for example, host 108 receiving a web page containing menus, buttons, notebook tabs, edit forms, lists, frames, or other features. Host 108 displays the web page to a user at step 704. This may include, for example, a browser at host 108 displaying the web page.

Host 108 allows the user to navigate the web page using only keyboard 114 at step 705. For example, host 108 may allow the user to jump to particular features in the web page using Alt-x key combinations at step 706. As a particular example, one or more unique Alt-x key combinations can be associated with each menu, button, notebook tab, edit form, list, frame, or other feature in the web page. Host 108 could also allow the user to navigate within each feature using keyboard 114 at step 708. For example, the user could jump between text boxes in an edit form or entries in a list using the arrow keys 136, the Home key 138, and the End key 140.

In this embodiment, the use of mouse 116 at host 116 may or may not be supported according to particular needs. For example, host 108 could allow the user to navigate application 110 using keyboard 114 and/or mouse 116. This may encourage wider use of application 110 by a larger number of users. In particular, users could choose whether to navigate application 110 using only keyboard 114, only mouse 116, or a combination of keyboard 114 and mouse 116.

Although FIG. 7 illustrates an example method 700 for allowing a user to navigate a web application using a keyboard, various changes may be made to method 700. For example, server 102 could generate and host 108 could receive other types of displays and are not limited to generating and receiving web pages.

While this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for navigation of web-based applications, the method comprising:
generating a user interface, associated with a web-based application, for presentation by a program, wherein the user interface includes a form having a plurality of text boxes, and wherein the plurality of text boxes include a plurality of labels;
establishing a first navigation mechanism that provides navigation to one or more of the plurality of text boxes in the form in response to one or more of a plurality of first key selections, wherein the first navigation mechanism and the plurality of first key selections are associated with a keyboard, and wherein establishing the first navigation mechanism that provides navigation to the plurality of text boxes includes:
identifying a plurality of control characters from the plurality of labels associated with the plurality of text boxes, wherein the plurality of first key selections are associated with the plurality of control characters; and
establishing a first plurality of event handlers for the plurality of first key selections associated with the plurality of control characters;
establishing a second navigation mechanism that provides navigation among the plurality of text boxes in the form in response to one or more of a plurality of second key selections that include one or more of an arrow key selection, a Home key selection, an End key selection, a Shift-arrow key combination selection, a Shift-Home key combination selection, or a Shift-End key combination selection, wherein the second navigation mechanism and the plurality of second key selections are further associated with the keyboard, and wherein establishing the second navigation mechanism that provides navigation among the plurality of text boxes in the form includes establishing a second plurality of event handlers for the plurality of second key selections, wherein the first navigation mechanism overrides default use of one or more of the plurality of first key selections by the program or the second navigation mechanism overrides default use of one or more of the plurality of second key selections by the program, otherwise available during presentation by the program of the user interface;
providing the user interface for presentation by the program on a computer coupled to the keyboard, wherein the computer initiates one of the first plurality of event handlers to activate one of the plurality of text boxes in the form presented by the program in response to detecting one of the plurality of first key selections associated with the activated text box, and wherein the computer initiates one or more of the second plurality of event handlers to navigate in the user interface presented by the program to one or more of a first one, a last one, a next one, or a previous one of the plurality of text boxes in response to detecting one or more of the plurality of second key selections while a focus remains on the activated text box, and the computer overrides default use by the program of the detected one of the plurality of first key selections or of the detected one or more of the plurality of second key selections, otherwise available during the presentation by the program of the user interface, wherein one of the plurality of second key selections lowers a context menu; and
establishing a third navigation mechanism that provides navigation among a plurality of sub-features within the context menu in response to one or more of the plurality of second key selections, wherein establishing the third navigation mechanism that provides navigation among the plurality of sub-features within the context menu includes:
establishing a plurality of temporary event handlers for the plurality of second key selections, wherein the plurality of temporary event handlers override any of the plurality of second event handlers established for the plurality of second key selections in response to the second key selection that lowers the context menu; and cancelling the plurality of temporary event handlers established for the plurality of second key selections in response to closing the context menu, wherein the plurality of second event handlers reassume control for the plurality of second key selections in response to closing the context menu.

2. The method of claim 1, wherein the activated text box includes multiple lines, and wherein the computer initiates the one or more of the second plurality of event handlers to navigate from the activated text box that includes the multiple lines to the first one, the last one, the next one, or the previous one of the plurality of text boxes in response to detecting the one or more of the plurality of second key selections.

3. The method of claim 1, wherein the label associated with the activated text box includes a hyperlink, and wherein the computer places a focus on the hyperlink in the label associated with the activated text box.

4. A method for navigation of web-based applications, the method comprising:

generating a user interface associated with a web-based application, wherein the user interface includes a menu having a plurality of sub-features;

establishing a first navigation mechanism that lowers the menu in response to a first key selection, wherein the first navigation mechanism and the first key selection are associated with an input mechanism, and wherein establishing the first navigation mechanism that lowers the menu includes establishing an onkeydown event handler for the first key selection;

establishing a second navigation mechanism that provides navigation among the plurality of sub-features within the menu in response to one or more of a plurality of second key selections that include one or more of an arrow key selection, a Home key selection, an End key selection, a Shift-arrow key combination selection, a Shift-Home key combination selection, or a Shift-End key combination selection, wherein the second navigation mechanism and the plurality of second key selections are further associated with the input mechanism, and wherein establishing the second navigation mechanism that provides navigation among the plurality of sub-features within the menu includes:

establishing a plurality of temporary onkeydown event handlers for the plurality of second key selections, wherein the plurality of temporary onkeydown event handlers override any default onkeydown event handlers for the plurality of second key selections in response to the first key selection lowering the menu; and cancelling the plurality of temporary onkeydown event handlers established for the plurality of second key selections in response to the menu closing, wherein the default onkeydown event handlers reassume control for the plurality of second key selections in response to cancelling the plurality of temporary onkeydown event handlers for the plurality of second key selections; and providing the user interface for display on a computer coupled to the input mechanism, wherein the computer initiates the onkeydown event handler to lower the menu in the displayed user interface in response to detecting the first key selection, and wherein the computer initiates one or more of the plurality of temporary onkeydown event handlers to navigate among the plurality of sub-features within the lowered menu in response to detecting one or more of the plurality of second key selections while the menu remains lowered.

5. A system for navigation of web-based applications, the system comprising logic encoded on a non-transitory computer readable medium, wherein executing the logic on a computer causes the computer to:

generate a user interface, associated with a web-based application, for presentation by a program, wherein the user interface includes a form having a plurality of text boxes, and wherein the plurality of text boxes include a plurality of labels;

establish a first navigation mechanism that provides navigation to one or more of the plurality of text boxes in the form in response to one or more of a plurality of first key selections, wherein the first navigation mechanism and the plurality of first key selections are associated with a keyboard, and wherein to establish the first navigation mechanism that provides navigation to the plurality of text boxes, the logic further causes the computer to:

identify a plurality of control characters from the plurality of labels associated with the plurality of text boxes, wherein the plurality of first key selections are associated with the plurality of control characters; and establish a first plurality of event handlers for the plurality of first key selections associated with the plurality of control characters;

establish a second navigation mechanism that provides navigation among the plurality of text boxes in the form in response to one or more of a plurality of second key selections that include one or more of an arrow key selection, a Home key selection, an End key selection, a Shift-arrow key combination selection, a Shift-Home key combination selection, or a Shift-End key combination selection, wherein the second navigation mechanism and the plurality of second key selections are further associated with the keyboard, and wherein the computer establishes a second plurality of event handlers for the plurality of second key selections to establish the second navigation mechanism that provides navigation among the plurality of text boxes in the form, wherein the first navigation mechanism overrides default use of one or more of the plurality of first key selections by the program or the second navigation mechanism overrides default use of one or more of the plurality of second key selections by the program, otherwise available during presentation by the program of the user interface;

provide the user interface for presentation by the program on the computer, wherein the computer initiates one of the first plurality of event handlers to activate one of the plurality of text boxes in the form presented by the program in response to detecting one of the plurality of first key selections associated with the activated text box, and wherein the computer initiates one or more of the second plurality of event handlers to navigate in the user interface presented by the program to one or more of a first one, a last one, a next one, or a previous one of the plurality of text boxes in response to detecting one or more of the plurality of second key selections while a focus remains on the activated text box, and the computer overrides default use by the program of the detected one of the plurality of first key selections or of the detected one or more of the plurality of second key selections, otherwise available during the presentation by the program of the user interface, wherein one of the plurality of second key selections lowers a context menu; and establish a third navigation mechanism that provides navigation among a plurality of sub-features within the context menu in response to one or more of the plurality of second key selections, wherein to establish the third navigation mechanism that provides navigation among the plurality of sub-features within the context menu, the logic causes the computer to:

establish a plurality of temporary event handlers for the plurality of second key selections, wherein the plurality of temporary event handlers override any of the plurality of second event handlers established for the plurality of second key selections in response to the second key selection that lowers the context menu; and cancel the plurality of temporary event handlers established for the plurality of second key selections in response to closing the context menu, wherein the activated text box and the plurality of second event handlers reassume control for the plurality of second key selections in response to closing the context menu.

6. The system of claim 5, wherein the activated text box includes multiple lines, and wherein the computer initiates the one or more of the second plurality of event handlers to navigate from the activated text box that includes the multiple lines to the first one, the last one, the next one, or the previous one of the plurality of text boxes in response to detecting the one or more of the plurality of second key selections.

7. The system of claim 5, wherein the label associated with the activated text box includes a hyperlink, and wherein the computer places a focus on the hyperlink in the label associated with the activated text box.

8. A system for navigation of web-based applications, the system comprising logic encoded on a non-transitory computer readable medium, wherein executing the logic on a computer causes the computer to:

generate a user interface associated with a web-based application, wherein the user interface includes a menu having a plurality of sub-features;

establish a first navigation mechanism that lowers the menu in response to a first key selection, wherein the first navigation mechanism and the first key selection are associated with an input mechanism, and wherein to establish the first navigation mechanism that lowers the menu, the logic further causes the computer to establish an onkeydown event handler for the first key selection;

establish a second navigation mechanism that provides navigation among the plurality of sub-features within the menu in response to one or more of a plurality of second key selections that include one or more of an arrow key selection, a Home key selection, an End key selection, a Shift-arrow key combination selection, a Shift-Home key combination selection, or a Shift-End key combination selection, wherein the second navigation mechanism and the plurality of second key selections are further associated with the input mechanism, and wherein to establish the second navigation mechanism that provides navigation among the plurality of sub-features within the menu, the logic further causes computer to:

establish a plurality of temporary onkeydown event handlers for the plurality of second key selections, wherein the plurality of temporary onkeydown event handlers override any default onkeydown event handlers for the plurality of second key selections in response to the first key selection lowering the menu; and cancel the plurality of temporary onkeydown event handlers established for the plurality of second key selections in response to the menu closing, wherein the default onkeydown event handlers reassume control for the plurality of second key selections in response to cancelling the plurality of temporary onkeydown event handlers for the plurality of second key selections; and provide the user interface for display on the computer, wherein the computer initiates the onkeydown event handler to lower the menu in the displayed user interface in response to detecting the first key selection, and wherein the computer initiates one or more of the plurality of temporary onkeydown event handlers to navigate among the plurality of sub-features within the lowered menu in response to detecting one or more of the plurality of second key selections while the menu remains lowered.

9. A system for navigation of web-based applications, the system comprising:

a memory operable to store a user interface associated with a web-based application, wherein the user interface includes a menu having a plurality of sub-features; and a processor operable to:

establish a first navigation mechanism that lowers the menu in response to a first key selection, wherein the first navigation mechanism and the first key selection are associated with an input mechanism, and wherein the processor establishes an onkeydown event handler for the first key selection to establish the first navigation mechanism that lowers the menu;

establish a second navigation mechanism that provides navigation among the plurality of sub-features within the menu in response to one or more of a plurality of second key selections that include one or more of an arrow key selection, a Home key selection, an End key selection, a Shift-arrow key combination selection, a Shift-Home key combination selection, or a Shift-End key combination selection, wherein the second navigation mechanism and the plurality of second key selections are further associated with the input mechanism, and wherein to establish the second navigation mechanism that provides navigation among the plurality of sub-features within the menu, the processor is further operable to:

establish a plurality of temporary onkeydown event handlers for the plurality of second key selections, wherein the plurality of temporary onkeydown event handlers override any default onkeydown event handlers for the plurality of second key selections in response to the first key selection lowering the menu; and cancel the plurality of temporary onkeydown event handlers established for the plurality of second key selections in response to the menu closing, wherein the default onkeydown event handlers reassume control for the plurality of second key selections in response to cancelling the plurality of temporary onkeydown event handlers for the plurality of second key selections; and provide the user interface for display on a computer coupled to the input mechanism, wherein the computer initiates the onkeydown event handler to lower the menu in the displayed user interface in response to detecting the first key selection, and wherein the computer initiates one or more of the plurality of temporary onkeydown event handlers to navigate among the plurality of sub-features within the lowered menu in response to detecting one or more of the plurality of second key selections while the menu remains lowered.

\* \* \* \* \*